Oct. 1, 1946. S. I. HITCHCOCK 2,408,641
DYNAMOELECTRIC MACHINE
Filed March 6, 1944 2 Sheets—Sheet 1

Inventor
Stanley Isaiah Hitchcock
By
Stevens and Davis
Attorneys

Oct. 1, 1946.   S. I. HITCHCOCK   2,408,641
DYNAMOELECTRIC MACHINE
Filed March 6, 1944   2 Sheets-Sheet 2
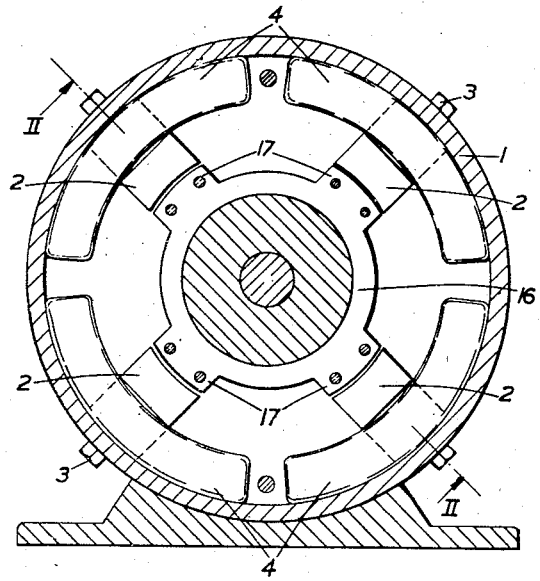
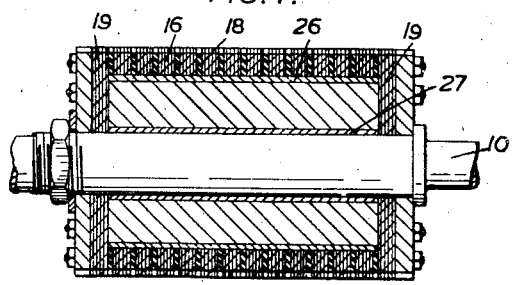
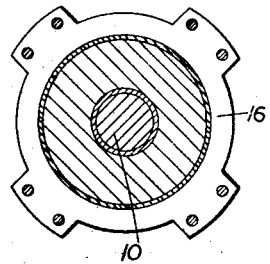
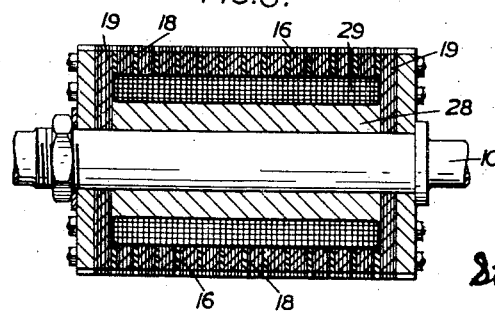
Inventor
Stanley Isaiah Hitchcock
By
Stevens and Davis
Attorneys Patented Oct. 1, 1946

2,408,641

UNITED STATES PATENT OFFICE 2,408,641

DYNAMOELECTRIC MACHINE

Stanley Isaiah Hitchcock, London, England, assignor to Tropical Plantations Limited, London, England, a British company Application March 6, 1944, Serial No. 525,226
In Great Britain April 20, 1943

7 Claims. (Cl. 171—209)

This invention relates to permanent or electromagnet motor or generator structures, one of the objects being to utilise to the greatest advantage the lines of magnetic flux emanating from the poles of the permanent or electro-magnet or magnets incorporated therein by minimising the stray flux and thereby to increase the efficiency of the structure as a motor or generator.

A further object of the invention, which is concerned with permanent magnets employed in such structures, for example a permanent magnet incorporated in the rotor of a permanent magnet motor or generator, is to prevent or minimise demagnetisation of the permanent magnet either when the rotor is not fitted in position within the motor or generator, or when the pole-pieces of the rotor are not disposed directly opposite the pole-pieces of the stator, in which position the stator pole-pieces no longer have a keeper effect on the permanent magnet. In this connection it will be readily appreciated that the pole-pieces of the rotor during rotation will only momentarily occupy a position directly opposite the stator pole-pieces.

The invention consists broadly in associating with a magnet of a permanent or electromagnet motor or generator, a flux leakage path, which path will carry the leakage flux between the magnet poles without actually short-circuiting the magnet, the path consisting of members composed of soft iron or other material having a low reluctance value, the path being broken at one or more points intermediate the magnet poles by an air gap or gaps, or by one or more intervening members of non-magnetic material. The width of the air gap or gaps and/or the thickness of the members or layers of non-magnetic material will depend on circumstances such as the size and strength of the magnet and the particular design of the structure in which it is to be incorporated.

In order that the said invention may be clearly understood and readily carried into effect, the same will now be described more fully with reference to the accompanying drawings, wherein:

Figure 3 is a transverse section on the line III—III in Figure 2;

Figure 4 is a longitudinal section of a rotor for use in the structure illustrated by Figures 1 to 3 but slightly modified;

Figure 5 is a transverse section of the same; and

Figure 6 is a longitudinal section of a rotor constructed in accordance with the invention incorporating an electro-magnet.

Figure 1:
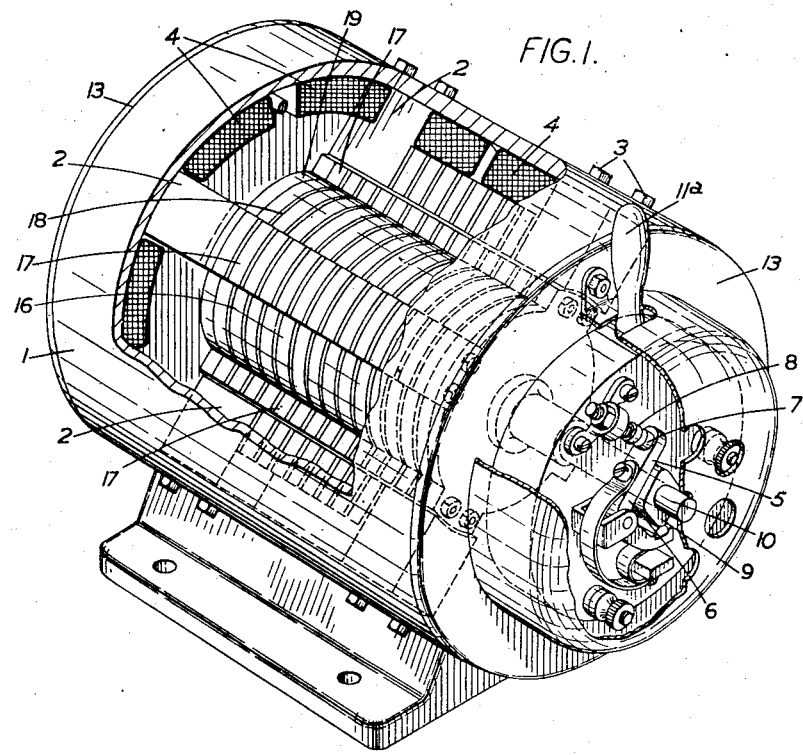
Figure 1 is a fragmentary perspective view of a permanent magnet motor constructed in accordance with the invention.
Figure 2:
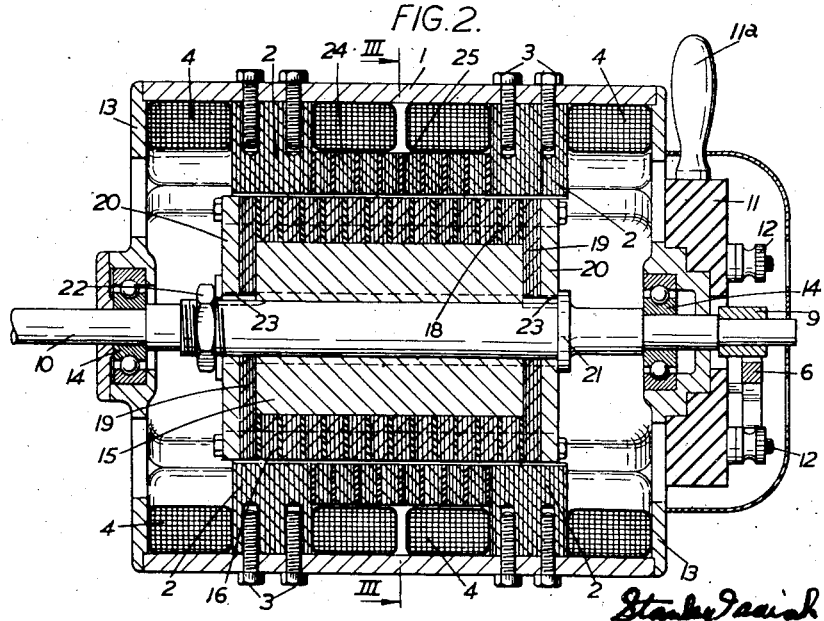
Figure 2 is a longitudinal section view on the line II—II in Figure 3.

The permanent magnet motor illustrated by Figures 1 to 3 of the accompanying drawings includes a casing 1 containing four pairs of electro-magnets, the cores 2 of which magnets are attached to the inner surface of the casing by means of securing studs 3, each core carrying a surrounding coil winding 4, all the coils being preferably connected together in series so that they will be energised simultaneously when connected with a battery or other suitable source of electric supply, the flow of current to the coils being controlled by a quick action make-and-break type contact breaker 5 consisting of a pivoted rocker arm 6 carrying a contact point 7 adapted to make intermittent electrical contact with a fixed contact point 8 under the action of a spring and a cam 9, the latter being secured to the rotor shaft 10, the insulated base 11 carrying the rocker arm and spring, and the contact 8 being so mounted that it can be moved angularly about the axis of the rotor shaft for the purpose of varying the speed of the motor and controlling its direction of rotation, the plate 11 being provided with a suitable handle or lever 11a for the purpose of easy adjustment. The member 11 is fitted with two terminals 12 for the attachment of leads for supplying electric current to the windings of the stator coils by way of the contact breaker.

With the type of contact breaker illustrated, the stator windings are intermittently energised with a unidirectional current, but if desired a contact breaker of any other suitable type may be employed which will produce a periodical reversal of the current through the windings, such for example as the contact breaker disclosed by the specification and drawings of application Serial No. 456,850, filed September 1, 1942, now Patent No. 2,374,998, dated May 1, 1945. With either form of contact breaker succeeding poles of the stator system at each respective end of the motor will be of like polarity, their polarity in the case of the second type of contact breaker being periodically reversed and at the appropriate time to facilitate the passage of the rotor pole-pieces past the stator magnets.

The end plates 13 of the casing carry bearings 14 for the rotor shaft 10, the latter being composed of a non-magnetic metal for the purpose of preventing the cylindrical permanent magnet 15 mounted thereon from being short-circuited, the magnetic axis of the magnet lying coaxial with the axis of the shaft.

The permanent magnet 15 carries a series of spaced laminations 16 composed of soft iron or other metal having a low reluctance value, the laminations being formed with radially-arranged projections 17 and being spaced apart by intervening layers 18 of non-magnetic material. The permanent magnet is sandwiched between two pole-pieces 19 which are bored to receive the rotor shaft, the pole-pieces being composed of soft iron or other metal having a low reluctance value, the pole-pieces being externally of similar shape to the laminations 17. The laminations, pole-pieces and permanent magnets are held together in position on the rotor shaft by end plates 20, one of which abuts against an annular shoulder 21 on the rotor shaft, the rotor shaft being screw-threaded at the opposite end of the rotor to receive a securing nut 22 which, when tightened up, serves to clamp the various parts firmly in position. Any possible angular movement of the pole-pieces and end plates relative to the rotor shaft is prevented by keys 23 located in keyways formed in the rotor shaft and the pole-pieces and end plates.

Laminations 24 of soft iron or other metal having a low reluctance value are also interposed between the cores 2 of the stator magnets, the laminations being maintained in spaced relationship by intervening layers 25 of non-magnetic material, the laminations and spacing members corresponding in width to the width of the cores and to the width of the projections 17 of the laminations 16 incorporated in the rotor. As shown clearly in Figure 2, the laminations 16 and 24 are disposed in staggered relationship, and it is found as a result of experiment that when the laminations of the rotor and stator are arranged in this way with a small intervening air gap between the rotor and stator, that the lines of magnetic flux passing between the poles of the cylindrical permanent magnet contained in the rotor and the lines of magnetic flux passing between the cores of the electrically-energized magnets will take a zigzag or sinuous course through the laminations included in the fixed and moving magnet systems.

When, however, the moving pole-pieces, that is to say the radial projections on the parts 16 and 19 of the rotor occupy a position intermediate the pole-pieces of the stator magnets, the laminations 16 of the rotor although not actually short-circuiting the permanent magnet nevertheless provide a leakage path of medium reluctance for the passage of lines of magnetic flux between the poles of the permanent magnet, thereby providing a keeper effect when the rotor is not actually assembled in the motor and during rotational movement of the rotor when the pole-pieces of the rotor magnet are not disposed opposite the pole-pieces of the stator magnet.

The operation of the device, which incidentally is an improvement over that described and claimed in the above-mentioned prior application Ser. No. 456,850, will be readily apparent upon inspection. As disclosed in the prior application, the field windings may be energized to set up an attractive force between the poles of the two magnet systems, in which case the electrical circuit to the field windings will be completed through the quick-action make-and-break type contact breaker 5 just before the pole pieces of the permanent magnet 15 of the rotor approach the soft iron cores 2 of the energized magnets of the stator, the electrical circuit being broken immediately the pole pieces lie directly opposite the cores 2, the momentum of the moving magnet system of the rotor causing it to swing past the fixed magnet system of the stator. Alternatively, the device may be so arranged as to cause the field windings of the stator to be energized only when the pole pieces of the permanent magnet 15 are opposite or substantially opposite the cores 2 of the electrically energized magnets of the stator, the direction of current flow being such that a repellent force is exerted between the magnets of the two systems, the flow of current through the field windings being cut off at the point where the pole pieces of the permanent magnet lie substantially intermediate the cores of the stationary magnets, further rotational movement of the moving magnet system resulting from the inductive effect between the pole pieces of the permanent magnet and the soft iron cores of the magnets of the stator, continuous rotation thus taking place.

On the other hand, and particularly when employing a periodically reversing contact breaker such as is shown in the prior application Ser. No. 456,850, the arrangement may be such that when the pole pieces of the permanent magnet are situated substantially midway between the cores of the stator magnets there shall be no flow of current through the field windings, and that upon the parts approaching more closely together, the field windings shall be energized to set up an attractive force between the parts. The flow of current is once more discontinued when the pole pieces lie opposite the cores of the magnets of the stator, the flow of current then being reversed to produce a repellent force between the pole pieces of the rotor magnet and the cores of the energized stator magnets, and thus to assist the pole pieces of the rotor magnet to swing past the cores of the stator magnets, the electrical circuit being once more broken when the parts are in an intermediate position, and the cycle then being repeated.

In Figures 1 to 3 of the accompanying drawings the permanent magnet 15 is shown in direct contact with the rotor shaft 10 and also in direct contact with the laminations 16; but in Figures 4 and 5 an alternative arrangement is shown wherein the laminations 16 are maintained out of direct contact with the curved peripheral surface of the permanent magnet by the interposition of a layer 26 of non-magnetic material, a further layer 27 of non-magnetic material being if desired interposed between the permanent magnet and its associated shaft. The permanent magnet is, for example, provided with a surface layer internally and externally of non-ferrous die-casting metal. The pole-pieces 19 in this case contact the end faces of the permanent magnet and are therefore free to receive lines of magnetic flux emanating from the magnet pole-pieces; whereas, due to the interposition of the layer of non-magnetic material 26 between the laminations and curved surface of the permanent magnet, lines of magnetic flux emanating from the magnet as a whole must necessarily enter the pole-pieces to pass through the laminations and over the intervening layers of non-magnetic material until they finally pass into the pole-piece disposed at the opposite end. The laminations 16 and intervening layers 18 of non-magnetic material thus again provide a leakage path, as in the construction previously described.

In Figure 6 is shown a rotor of an electric motor or generator which includes a soft iron cylindrical core 28 carrying a surrounding wire-wound coil 29, the latter being once again surrounded by soft iron or similar laminations 16 which are spaced apart by intervening members 18 of non-magnetic material. The soft iron core 28 is in contact at its ends with soft iron members 19 forming pole-pieces. The object of providing the laminations and intervening spacing members in this case is not to provide any keeper effect, but when the rotor is assembled within a motor or generator incorporating stator magnets arranged as in Figures 1 to 3, to provide in conjunction with the laminations and spacing members separating the stator magnets a path for the stray lines of magnetic flux between the pole-pieces 19, the lines of magnetic flux in passing between the pole-pieces being forced to take a zigzag or sinuous path.

Although in the constructions illustrated the members comprising the leakage paths are shown lying in planes transverse or substantially transverse to the rotor axis, they may nevertheless comprise a series of narrow strip-like members composed of a metal having a low reluctance value, spaced apart from their associated magnet by intervening non-magnetic material and lying parallel with the axis of the magnet.

What I claim is:

1. In an electromotive structure including a rotor incorporating a cylindrical permanent magnet having circumferentially spaced pole pieces at its opposite ends and a stator comprising circumferentially spaced complementary pole pieces and wound cores for energizing the same, the improvement that comprises a first series of laminations of a material of low reluctance extending between the pole pieces at opposite ends of said rotor, a second series of laminations extending between the pole pieces of said stator, the laminations of the first and second series defining therebetween an air gap, and intervening spacing members of non-magnetic material subdividing both series of laminations, the spacing members of the first series being staggered with respect to those of the second whereby a sinuous flux path between rotor and stator is provided while the pole pieces are in registry and a flux leakage path of medium reluctance is provided between the pole pieces.

2. A structure as claimed in claim 1 wherein the laminations constituting the rotor flux leakage path are of disc-like form and are provided with radially arranged projections conforming in shape to the pole pieces, said laminations being bored to receive the cylindrical magnet and being clamped in position between the pole pieces.

3. A structure as claimed in claim 1 wherein the spacing members interposed between the laminations are of similar shape to the various laminae.

4. A structure as claimed in claim 1 wherein the laminations of the first series are in direct contact with the curved surface of the permanent magnet.

5. A structure as claimed in claim 1 further comprising a layer of non-magnetic material interposed between the first series of laminations and the curved surface of the permanent magnet.

6. In an electromotive structure including rotor and stator elements, one of said elements incorporating a permanent magnet having circumferentially spaced pole pieces at its opposite ends and the other of said elements comprising circumferentially spaced complementary pole pieces and windings for energizing the same, the improvement that comprises a first series of laminations of a material of low reluctance extending between the pole pieces at opposite ends of the element incorporating the permanent magnet, a second series of laminations extending between the pole pieces of the element comprising the wound core, the laminations of the first and second series defining therebetween an air gap, and intervening spacing members of non-magnetic material subdividing both series of laminations, the spacing members of the first series being staggered with respect to those of the second, whereby a sinuous flux path between rotor and stator is provided while the pole-pieces are in registry and a flux-leakage path of medium reluctance is provided between the pole pieces while the stator and rotor pole pieces are out of registry.

7. A structure as claimed in claim 6 wherein the rotor includes a soft iron core and the winding surrounds it, soft iron pole-pieces being provided at the opposite ends of said core, and wherein the laminations extending between the pole pieces of the rotor are of annular form and are provided with a series of spaced radially extending projections.

STANLEY ISAIAH HITCHCOCK.